US010823000B2

(12) United States Patent
Pankaj et al.

(10) Patent No.: US 10,823,000 B2
(45) Date of Patent: Nov. 3, 2020

(54) TURBOMACHINE WITH ALTERNATINGLY SPACED TURBINE ROTOR BLADES

(71) Applicant: General Electric Company, Schenectady, NY (US)

(72) Inventors: Peeyush Pankaj, Bangalore (IN); Shashank Suresh Puranik, Bangalore (IN); Darek Tomasz Zatorski, Fort Wright, KY (US); Christopher Charles Glynn, Clearwater Beach, FL (US); Richard Schmidt, Loveland, OH (US)

(73) Assignee: General Electric Company, Schenectady, NY (US)

(*) Notice: Subject to any disclaimer, the term of this patent is extended or adjusted under 35 U.S.C. 154(b) by 213 days.

(21) Appl. No.: 15/710,138

(22) Filed: Sep. 20, 2017

(65) Prior Publication Data

US 2019/0085720 A1    Mar. 21, 2019

(51) Int. Cl.
  *F01D 25/16*  (2006.01)
  *F01D 5/30*   (2006.01)
  *F02C 7/36*   (2006.01)
  *F02K 3/04*   (2006.01)
  *F02C 3/04*   (2006.01)
  (Continued)

(52) U.S. Cl.
  CPC ............... *F01D 25/16* (2013.01); *F01D 5/30* (2013.01); *F02C 3/04* (2013.01); *F02C 3/067* (2013.01); *F02C 7/06* (2013.01); *F02C 7/32* (2013.01); *F02C 7/36* (2013.01); *F02K 3/04* (2013.01); *F01D 25/164* (2013.01); *F05D 2240/24* (2013.01); *F05D 2240/40* (2013.01); *F05D 2240/50* (2013.01); *F05D 2260/4031* (2013.01)

(58) Field of Classification Search
  CPC . F01D 5/30; F01D 25/24; F01D 25/28; F01D 25/16; F01D 25/162; F01D 25/164; F02D 25/16; F02D 25/162; F02C 3/067; F02C 7/06; F02C 7/32; F02C 3/107; F02C 7/36; F02C 7/20; F05D 2220/32
  See application file for complete search history.

(56) References Cited

U.S. PATENT DOCUMENTS 2,478,206 A    8/1949  Redding
3,546,880 A   12/1970  Schwaar
(Continued)

FOREIGN PATENT DOCUMENTS

GB           2485744        5/2012

*Primary Examiner* — Erick R Solis
*Assistant Examiner* — Robert A Werner
(74) *Attorney, Agent, or Firm* — Dority & Manning, P.A.

(57) ABSTRACT

A turbomachine includes a spool and a turbine section. The turbine section includes a turbine center frame and a turbine, with the turbine including a first plurality of turbine rotor blades and a second plurality of turbine rotor blades. The first plurality of turbine rotor blades and second plurality of turbine rotor blades are alternatingly spaced along the axial direction. The turbomachine also includes a gearbox aligned with, or positioned aft of, a midpoint of the turbine. The gearbox includes a first gear coupled to the first plurality of rotor blades, a second gear coupled to the second plurality of rotor blades, and a third gear coupled to the turbine center frame. The turbomachine also includes a support member, the first plurality of turbine rotor blades coupled to the spool through the support member, the support member extending aft of the gearbox.

21 Claims, 4 Drawing Sheets

(51) Int. Cl.
*F02C 7/06* (2006.01)
*F02C 7/32* (2006.01)
*F02C 3/067* (2006.01)

(56) References Cited

U.S. PATENT DOCUMENTS

| | | | |
|---|---|---|---|
| 3,673,802 A * | 7/1972 | Krebs | F02C 3/067 |
| | | | 60/226.1 |
| 4,296,599 A | 10/1981 | Adamson | |
| 4,621,978 A * | 11/1986 | Stuart | F01D 7/00 |
| | | | 415/65 |
| 4,947,642 A | 8/1990 | Grieb et al. | |
| 4,969,325 A | 11/1990 | Adamson et al. | |
| 5,274,999 A | 1/1994 | Rohra et al. | |
| 6,619,030 B1 | 9/2003 | Seda et al. | |
| 6,763,654 B2 | 7/2004 | Orlando et al. | |
| 7,186,073 B2 | 3/2007 | Orlando et al. | |
| 7,195,446 B2 | 3/2007 | Seda et al. | |
| 7,269,938 B2 | 9/2007 | Moniz et al. | |
| 7,290,386 B2 | 11/2007 | Orlando et al. | |
| 7,334,392 B2 | 2/2008 | Moniz et al. | |
| 7,334,981 B2 * | 2/2008 | Moniz | F01D 25/16 |
| | | | 29/889.2 |
| 7,451,592 B2 | 11/2008 | Taylor et al. | |
| 7,594,388 B2 | 9/2009 | Cherry et al. | |
| 8,015,798 B2 | 9/2011 | Norris et al. | |
| 8,191,352 B2 * | 6/2012 | Schilling | F02C 3/107 |
| | | | 415/65 |
| 8,402,742 B2 | 3/2013 | Roberge et al. | |
| 8,876,462 B2 * | 11/2014 | Balk | B64C 11/48 |
| | | | 415/69 |
| 8,931,285 B2 * | 1/2015 | McCune | F01D 25/18 |
| | | | 60/792 |
| 9,011,076 B2 | 4/2015 | Suciu et al. | |
| 9,017,028 B2 | 4/2015 | Fabre | |
| 9,022,725 B2 | 5/2015 | Merry et al. | |
| 9,028,200 B2 | 5/2015 | Suciu et al. | |
| 9,074,485 B2 | 7/2015 | Suciu et al. | |
| 9,080,512 B2 | 7/2015 | Suciu et al. | |
| 9,194,290 B2 * | 11/2015 | Suciu | F02K 3/072 |
| 2005/0226720 A1 | 10/2005 | Harvey et al. | |
| 2006/0090451 A1 | 5/2006 | Moniz et al. | |
| 2008/0184694 A1 | 8/2008 | Guimbard et al. | |
| 2009/0151317 A1 | 6/2009 | Norris et al. | |
| 2010/0154384 A1 | 6/2010 | Schilling | |
| 2010/0326050 A1 | 12/2010 | Schilling et al. | |
| 2013/0000322 A1 | 1/2013 | Silkowski | |
| 2013/0219856 A1 | 8/2013 | Suciu et al. | |
| 2013/0219859 A1 | 8/2013 | Suciu et al. | |
| 2013/0219860 A1 | 8/2013 | Suciu et al. | |
| 2013/0223992 A1 * | 8/2013 | Suciu | F02K 3/072 |
| | | | 415/122.1 |
| 2013/0223993 A1 | 8/2013 | Merry et al. | |
| 2014/0206496 A1 | 7/2014 | McCune et al. | |
| 2014/0241856 A1 | 8/2014 | Roberge et al. | |
| 2015/0354502 A1 | 12/2015 | Kuhne et al. | |
| 2016/0102607 A1 | 4/2016 | Hiernaux | |
| 2016/0160681 A1 | 6/2016 | Roach et al. | |
| 2016/0195010 A1 | 7/2016 | Roberge | |
| 2016/0298539 A1 | 10/2016 | Roberge | |
| 2018/0274365 A1 | 9/2018 | Stuart et al. | |
| 2019/0085701 A1 | 3/2019 | Pankaj et al. | |
| 2019/0085702 A1 | 3/2019 | Pankaj et al. | |
| 2019/0085716 A1 | 3/2019 | Pankaj et al. | |
| 2019/0085721 A1 | 3/2019 | Pankaj et al. | |
| 2019/0085722 A1 | 3/2019 | Pankaj et al. | |
| 2019/0085723 A1 | 3/2019 | Pankaj et al. | |

* cited by examiner

TURBOMACHINE WITH ALTERNATINGLY SPACED TURBINE ROTOR BLADES

FIELD

The present subject matter relates generally to a turbomachine, and more particularly, to a turbine of a turbomachine having alternatingly spaced turbine rotor blades rotatable with one another through an aft-positioned gearbox.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Within at least certain gas turbine engines, the turbine section may include interdigitated rotors (i.e., successive rows or stages of rotating airfoils or blades). For example, a turbine section may include a turbine having a first plurality of low speed turbine rotor blades and a second plurality of high speed turbine rotor blades. The first plurality of low speed turbine rotor blades may be interdigitated with the second plurality of high speed turbine rotor blades. Such a configuration may result in a more efficient turbine.

However, several problems may arise with such a configuration relating to unwanted vibrations, clearance issues between the first and second pluralities of rotor blades, weight issues related to supporting the dual pluralities of turbine rotor blades, etc. Accordingly, an improved turbine with interdigitated turbine rotor blades would be useful.

BRIEF DESCRIPTION

Aspects and advantages of the invention will be set forth in part in the following description, or may be obvious from the description, or may be learned through practice of the invention.

In one exemplary embodiment of the present disclosure, a turbomachine defining a radial direction and an axial direction is provided. The turbomachine includes a spool; and a turbine section including a turbine center frame and a turbine, the turbine including a first plurality of turbine rotor blades and a second plurality of turbine rotor blades, the first plurality of turbine rotor blades and second plurality of turbine rotor blades alternatingly spaced along the axial direction, the turbine defining a midpoint along the axial direction. The turbomachine also includes a gearbox aligned with, or positioned aft of, the midpoint of the turbine, the gearbox including a first gear coupled to the first plurality of rotor blades, a second gear coupled to the second plurality of rotor blades, and a third gear coupled to the turbine center frame. The turbomachine also includes a support member, the first plurality of turbine rotor blades coupled to the spool through the support member, the support member extending aft of the gearbox.

In certain exemplary embodiments the support member is a first support member. With such an exemplary embodiment, the turbomachine may further include a bearing assembly; and a second support member, the second plurality of turbine rotor blades supported by the second support member, wherein the spool and first support member are supported aft of the midpoint of the turbine substantially completely through the bearing assembly, the bearing assembly positioned between the first support member and second support member.

In certain exemplary embodiments the support member is a first support member. With such an exemplary embodiment, the turbomachine may further include a bearing assembly; and a second support member, the second plurality of turbine rotor blades supported by the second support member, wherein the spool and first support member are supported within the turbine section substantially completely through the bearing assembly, the bearing assembly positioned between the first support member and second support member.

For example, in certain exemplary embodiments the bearing assembly is positioned aft of the midpoint of the turbine.

For example, in certain exemplary embodiments the bearing assembly is a first bearing assembly, wherein the first bearing assembly includes a first bearing and a second bearing. With such an exemplary embodiment, the turbomachine may further include a second bearing assembly supporting the second support member.

For example, in certain exemplary embodiments the first bearing is configured as a roller bearing and the second bearing is configured as a ball bearing.

For example, in certain exemplary embodiments the bearing assembly is aligned with and positioned radially outward of the gearbox.

In certain exemplary embodiments the first plurality of turbine rotor blades is configured as a plurality of low-speed turbine rotor blades, and wherein the second plurality of turbine rotor blades is configured as a plurality of high-speed turbine rotor blades.

For example, in certain exemplary embodiments the plurality of low-speed turbine rotor blades each extend between a radially inner end and a radially outer end, and wherein at least two of the plurality of low-speed turbine rotor blades are spaced from one another along the axial direction and coupled to one another at the radially outer ends.

For example, in certain exemplary embodiments the plurality of high-speed turbine rotor blades each extend between a radially inner end and a radially outer end, and wherein at least two of the plurality of high-speed turbine rotor blades are spaced from one another along the axial direction and coupled to one another at the radially inner ends.

For example, in certain exemplary embodiments the plurality of low-speed turbine rotor blades are configured to rotate in a first circumferential direction, and wherein the plurality of high-speed turbine rotor blades are configured to rotate in a second circumferential direction opposite the first circumferential direction.

In another exemplary embodiment of the present disclosure, a turbomachine defining a radial direction and an axial direction is provided. The turbomachine includes a spool; and a turbine section including a turbine center frame and a turbine, the turbine including a first plurality of turbine rotor blades and a second plurality of turbine rotor blades, the first plurality of turbine rotor blades and second plurality of turbine rotor blades alternatingly spaced along the axial direction. The turbomachine also includes a gearbox including a first gear coupled to the first plurality of rotor blades, a third gear coupled to the turbine center frame, and a second gear coupled to the second plurality of rotor blades. The turbomachine also includes a first support member, the first plurality of turbine rotor blades coupled to the spool through the first support member; a second support member coupled to the second plurality of turbine rotor blades; and a bearing assembly positioned between the first and second support members, the spool and the first plurality of turbine rotor blades supported substantially completely within the turbine section through the bearing assembly.

In certain exemplary embodiments the first support member extends around an aft end of the gearbox.

In certain exemplary embodiments the bearing assembly is positioned aft of the midpoint of the turbine.

In certain exemplary embodiments the bearing assembly includes a first bearing and a second bearing.

For example, in certain exemplary embodiments the first bearing is configured as a roller bearing and the second bearing is configured as a ball bearing.

In certain exemplary embodiments the bearing assembly is aligned with and positioned radially outward of the gearbox.

In certain exemplary embodiments the first plurality of turbine rotor blades is configured as a plurality of low-speed turbine rotor blades, and wherein the second plurality of turbine rotor blades is configured as a plurality of high-speed turbine rotor blades.

For example, in certain exemplary embodiments the plurality of low-speed turbine rotor blades each extend between a radially inner end and a radially outer end, and wherein at least two of the plurality of low-speed turbine rotor blades are spaced from one another along the axial direction and coupled to one another at the radially outer ends, and wherein the plurality of high-speed turbine rotor blades each extend between a radially inner end and a radially outer end, and wherein at least two of the plurality of high-speed turbine rotor blades are spaced from one another along the axial direction and coupled to one another at the radially inner ends.

For example, in certain exemplary embodiments the plurality of low-speed turbine rotor blades is coupled to the first gear of the gearbox through a first flexible member, and wherein the plurality of high-speed turbine rotor blades is coupled to the second gear of the gearbox through a second flexible member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
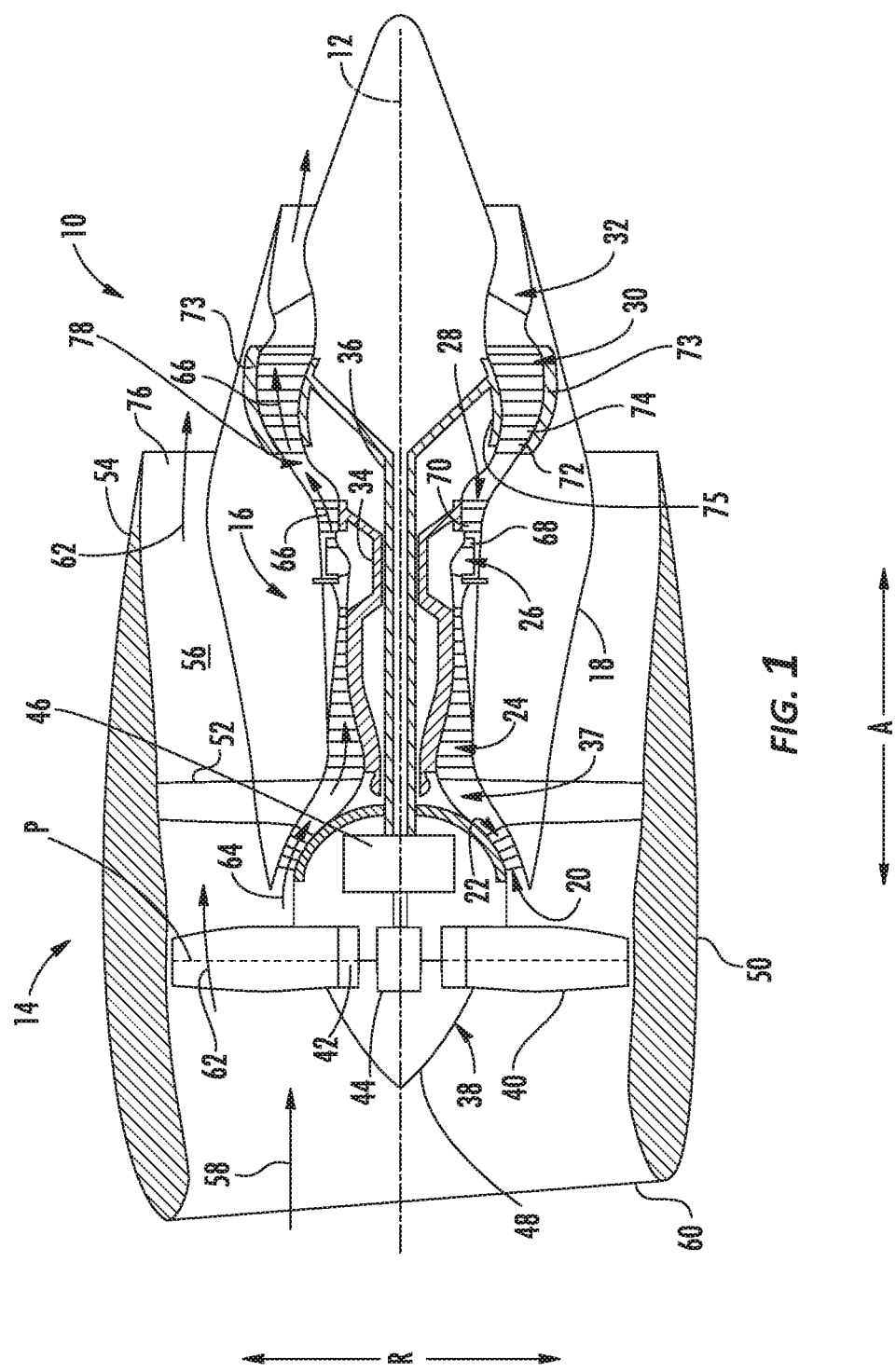
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The terms "low speed" and "high-speed" refer to relative speeds, such as relative rotational speeds, of two components during operations of the turbomachine, and do not imply or require any minimum or maximum absolute speeds.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure relates generally to a turbomachine having a turbine section, the turbine section including alternatingly spaced turbine rotor blades. More specifically, the turbine includes a first plurality of turbine rotor blades and a second plurality of turbine rotor blades, with the first plurality of turbine rotor blades alternatingly spaced with the second plurality of turbine rotor blades. Further, the turbomachine includes a gearbox. The gearbox includes a first gear coupled to the first plurality of turbine rotor blades, a second gear coupled to the second plurality of turbine rotor blades, and a third gear coupled to a turbine center frame of the turbomachine.

Moreover, the turbomachine includes a first support member coupling the first plurality of turbine rotor blades to a spool and a second support member configured to support the second plurality of turbine rotor blades. In at least certain embodiments, the gearbox may be aligned with, or positioned aft of, a midpoint of the turbine. With such an exemplary embodiment, the first support member may extend aft of the gearbox, or more particularly, may extend around an aft end of the gearbox between the first plurality of turbine rotor blades and the spool.

Additionally, or alternatively, in certain exemplary embodiments, the turbomachine may further include a bearing assembly positioned between the first and second support members. With such an embodiment, the spool of the turbomachine and the first plurality of turbine rotor blades of the turbine may be supported substantially completely within the turbine section of the turbomachine through such bearing assembly. In certain of these embodiments, the bearing assembly may be positioned radially outward of, and axially aligned with, the gearbox.

Inclusion of a turbine in accordance with one or more these exemplary embodiments may result in a lighter turbine section, as the turbine may not need to be supported by a turbine rear frame located aft of the turbine. Instead, with one or more these exemplary embodiments, substantially all of the turbine may be supported off a turbine center frame. Further, positioning the gearbox aft of the midpoint of the turbine may assist with isolating vibrations between a low pressure turbine and a center portion of the turbomachine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable spinner cone 48 aerodynamically contoured to promote an airflow through the plurality of fan blades 40. Additionally, the exemplary fan section 14 includes an annular fan casing or outer nacelle 50 that circumferentially surrounds the fan blades 40 of the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a first plurality of LP turbine rotor blades 72 that are coupled to an outer drum 73, and a second plurality of LP turbine rotor blades 74 that are coupled to an inner drum 75. The first plurality of LP turbine rotor blades 72 and second plurality of LP turbine rotor blades 74 are alternatingly spaced and rotatable with (which, as used herein, refers to two components being rotatable relative to one another) one another through a gearbox (not shown) to together drive the LP shaft or spool 36, thus causing the LP shaft or spool 36 to rotate. Such system thereby supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Figure 2:
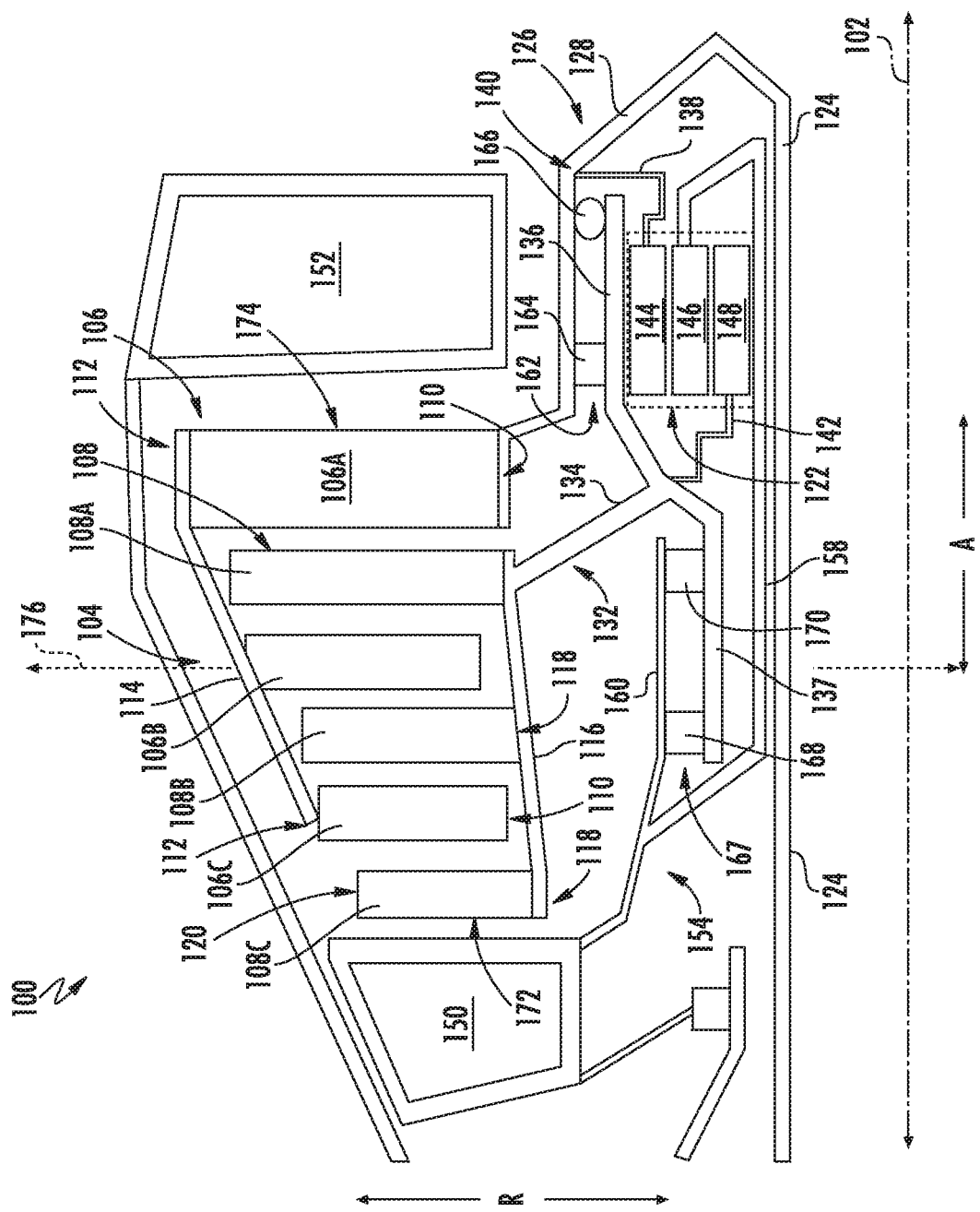
FIG. 2 is a close-up, schematic, cross sectional view of a turbine section in accordance with yet another exemplary aspect of the present disclosure.

Referring now to FIG. 2, a schematic, side, cross-sectional view is provided of a turbine section 100 of a turbomachine in accordance with an exemplary embodiment of the present disclosure. The exemplary turbine section 100 depicted in FIG. 2 may be incorporated into, e.g., the exemplary turbofan engine 10 described above with reference to FIG. 1. However, in other exemplary embodiments, the turbine section 100 may be integrated into any other suitable machine utilizing a turbine.

Accordingly, it will be appreciated that the turbomachine generally defines a radial direction R, an axial direction A, and a longitudinal centerline 102. Further, the turbine section 100 includes a turbine 104, with the turbine 104 of the turbine section 100 being rotatable about the axial direction A (i.e., includes one or more components rotatable about the axial direction A). For example, in certain embodiments, the turbine 104 may be a low pressure turbine (such as the exemplary low pressure turbine 30 of FIG. 1), or alternatively may be any other turbine (such as, a high pressure turbine, an intermediate turbine, a dual use turbine functioning as part of a high pressure turbine and/or a low pressure turbine, etc.).

Moreover, for the exemplary embodiment depicted, the turbine 104 includes a plurality of turbine rotor blades spaced along the axial direction A. More specifically, for the exemplary embodiment depicted, the turbine 104 includes a first plurality of turbine rotor blades 106 and a second plurality of turbine rotor blades 108. As will be discussed in greater detail below, the first plurality of turbine rotor blades 106 and second plurality of turbine rotor blades 108 are alternatingly spaced along the axial direction A.

Referring first to the first plurality of turbine rotor blades 106, each of the first plurality of turbine rotor blades 106 extends generally along the radial direction R between a radially inner end 110 and a radially outer end 112. Additionally, the first plurality of turbine rotor blades 106 includes a first turbine rotor blade 106A, a second turbine rotor blade 106B, and a third turbine rotor blade 106C, each spaced apart from one another generally along the axial direction A. At least two of the first plurality of turbine rotor blades 106 are spaced from one another along the axial direction A and coupled to one another at the respective radially outer ends 112. More specifically, for the embodiment depicted, each of the first turbine rotor blade 106A, the second turbine rotor blade 106B, and the third turbine rotor blade 106C are coupled to one another through their respective radially outer ends 112. More specifically, still, each of the first turbine rotor blade 106A, the second turbine rotor blade 106B, and the third turbine rotor blade 106C of the first plurality of turbine rotor blades 106 are coupled at their respective radially outer ends 112 through an outer drum 114.

Further, the second plurality of turbine rotor blades 108, each also extend generally along the radial direction R between a radially inner end 118 and a radially outer end 120. Additionally, for the embodiment depicted, the second plurality of turbine rotor blades 108 includes a first turbine rotor blade 108A, a second turbine rotor blade 108B, and a third turbine rotor blade 108C, each spaced apart from another generally along the axial direction A. For the embodiment depicted, at least two of the second plurality of turbine rotor blades 108 are spaced from one another along the axial direction A and coupled to one another at the respective radially inner ends 118. More specifically, for the embodiment depicted, each of the first turbine rotor blade 108A, the second turbine rotor blade 108B, and the third turbine rotor blade 108C of the second plurality of turbine rotor blades 108 are coupled to one another through their respective radially inner ends 118. More specifically, still, each of the first turbine rotor blade 108A, a second turbine rotor blade 108B, and a third turbine rotor blade 108C of the second plurality of turbine rotor blades 108 are coupled at their respective radially inner ends 118 through an inner drum 116.

It should be appreciated, however, that in other exemplary embodiments, the first plurality of turbine rotor blades 106 and/or the second plurality of turbine rotor blades 108 may be coupled together in any other suitable manner, and that as used herein, "coupled at the radially inner ends" and "coupled at the radially outer ends" refers generally to any direct or indirect coupling means or mechanism to connect the respective components. For example, in certain exemplary embodiments, the second plurality of turbine rotor blades 108 may include multiple stages of rotors (not shown) spaced along the axial direction A, with the first turbine rotor blade 108A, the second turbine rotor blade 108B, and the third turbine rotor blade 108C coupled to the respective stages of rotors at the respectively radially inner ends 118 through, e.g. dovetail base portions. The respective stages of rotors may, in turn, be coupled together to therefore "couple the second plurality of turbine rotor blades 108 at their respective radially inner ends 118."

Referring still to the embodiment depicted in FIG. 2, as stated, all the first plurality of turbine rotor blades 106 and the second plurality of turbine rotor blades 108 are alternatingly spaced along the axial direction A. As used herein, the term "alternatingly spaced along the axial direction A" refers to the second plurality of turbine rotor blades 108 including at least one turbine rotor blade positioned along the axial direction A between two axially spaced turbine rotor blades of the first plurality of turbine rotor blades 106. For example, for the embodiment depicted, alternatingly spaced along the axial direction A refers to the second plurality of turbine rotor blades 108 including at least one turbine rotor blade positioned between the first and second turbine rotor blades 106A, 106B of the first plurality of turbine rotor blades 106 along the axial direction A, or between the second and third turbine rotor blades 106B, 106C of the first plurality of turbine rotor blades 106 along the axial direction A. More specifically, for the embodiment depicted, the first turbine rotor blade 106A of the first plurality of turbine rotor blades 106 is positioned aft of the first turbine rotor blade 108A of the second plurality of turbine rotor blades 108; the second turbine rotor blade 106B of the first plurality of turbine rotor blades 106 is positioned between the first and second turbine rotor blades 108A, 108B of the second plurality of turbine rotor blades 108; and the third turbine rotor blade 106C of the first plurality of turbine rotor blades 106 is positioned between the second and third turbine rotor blades 108B, 108C of the second plurality of turbine rotor blades 108.

Notably, however, in other exemplary embodiments, the first plurality of turbine rotor blades 106 may have any other suitable configuration and/or the second plurality of turbine rotor blades 108 may have any other suitable configuration. For example, it will be appreciated that for the embodiments described herein, the first turbine rotor blade 106A, second turbine rotor blade 106B, and third turbine rotor blade 106C of the first plurality of turbine rotor blades 106 generally represent a first stage of turbine rotor blades, a second stage of turbine rotor blades, and a third stage of turbine rotor blades, respectively. It will similarly be appreciated that the first turbine rotor blade 108A, second turbine rotor blade 108B, and third turbine rotor blade 108C of the second plurality of turbine rotor blades 108 each also generally represent a first stage of turbine rotor blades, a second stage of turbine rotor blades, and a third stage of turbine rotor blades, respectively. Notably, it will be appreciated that the terms "first," "second," and "third" are used herein simply to distinguish components and that in other embodiments the components may have any other suitable name (e.g., in other embodiments, the third stage of turbine rotor blades represented by blade 108C, may be referred to as the "first stage" of turbine rotor blades of the turbine 104, the third stage of turbine rotor blades represented by blade 106C may be referred to as the "second stage" of turbine rotor blades of the turbine 104, etc.). In other exemplary embodiments, the first plurality of turbine rotor blades 106 and/or the second plurality of turbine rotor blades 108 may include any other suitable number of stages of turbine rotor blades, such as two stages, four stages, etc., and further that in certain exemplary embodiments, the turbine 104 may additionally include one or more stages of non-rotating stator vanes.

Referring still to the embodiment of FIG. 2, the turbine 104 further defines a midpoint 176 along the axial direction A. As used herein, the term "midpoint" refers generally to an axial location halfway between a forward-most forward edge of a forward-most turbine rotor blade of the turbine 104 and an aft-most aft edge of an aft-most turbine rotor blade of the turbine 104. Accordingly, for the embodiment depicted, the midpoint 176 of the turbine 104 is an axial location halfway between a forward-most forward edge 172 of the third turbine rotor blade 108C of the second plurality of turbine rotor blades 108 and an aft-most aft edge 174 of the first turbine rotor blade 106A of the first plurality of turbine rotor blades 106.

Moreover, for the embodiment depicted, the turbomachine further includes a gearbox 122 and a spool 124, with the first plurality of turbine rotor blades 106 and the second plurality of turbine rotor blades 108 rotatable with one another through the gearbox 122. In at least certain exemplary embodiments, the spool 124 may be configured as, e.g., the exemplary low pressure spool 36 described above with reference to FIG. 1. Additionally, the exemplary turbine section further includes a turbine center frame 150 and a turbine rear frame 152. The gearbox 122 is aligned with, or positioned aft of, the midpoint 176 of the turbine 104 for the embodiment depicted, and more specifically, is aligned with the turbine rear frame 152 along the axial direction A for the embodiment depicted. Notably, as used herein, the term "aligned with" with reference to the axial direction A refers to the two components and/or positions having at least a portion of the same axial position.

It should be appreciated, however, that in other exemplary embodiments, the spool 124 may be any other spool (e.g., a high pressure spool, an intermediate spool, etc.), and further that the gearbox 122 may be any other suitable speed change device positioned at any other suitable location. For example, in other exemplary embodiments, the gearbox 122 may instead be a hydraulic torque converter, an electric machine, a transmission, etc., and may be positioned forward of the midpoint 176 of the turbine 104.

Referring still to FIG. 2, the turbine section 100 includes a first support member assembly 126 having a first support member 128, and a second support member assembly 132 having a second support member 134 (the second support member 134, in turn, including an aft arm 136 and a forward arm 137). The first support member 128 couples the radially inner end 110 of the first turbine rotor blade 106A of the first plurality of turbine rotor blades 106 to the spool 124, and further couples the first plurality of turbine rotor blades 106 to the gearbox 122. Additionally, the second support member 134 similarly couples the second plurality of turbine rotor blades 108, or rather the radially inner end 118 of the first turbine rotor blade 108A of the second plurality of turbine rotor blades 108, to the gearbox 122. Notably, however, in other exemplary embodiments, the second support member 134 may couple to any of the other turbine rotor blades of the second plurality of turbine rotor blades 108 at the radially inner ends 118 (either directly or through, e.g., a rotor—not shown).

Further, for the embodiment depicted the, the first support member assembly 126 includes a first flexible connection 138 attached to the first support member 128 at a juncture 140 of the first support member 128 (although, in other embodiments, the first flexible connection 138 may be formed integrally with the first support member 128). Similarly, the second support member assembly 132 includes a second flexible connection 142 attached to, or formed integrally with, the second support member 134. The first flexible connection 138 and second flexible connection 142 allow for a less rigid connection between the gearbox 122 and the first support member 128 and second support member 134, respectively. More particularly, the first flexible connection 138 and the second flexible connection 142 allow for a less rigid connection between the gearbox 122 and the first plurality of turbine rotor blades 106 and the second plurality of turbine rotor blades 108, respectively. In certain embodiments, the first flexible connection 138, the second flexible connection 142, or both, may be configured as members having bellows, splined connections with resilient material, etc.

It should be appreciated, however, that in other exemplary embodiments, the gearbox 122 may be coupled to the first and second plurality of rotor blades 106, 108 and a stationary member (e.g., turbine center frame 150) in any other suitable manner. For example, in other exemplary embodiments, the first support member 128 may be rigidly coupled to the gearbox 122 (i.e., the member 138 may instead be substantially rigid) in order to better support the turbine 104. In such an embodiment, the radially inner center frame support member 158 may instead be flexibly coupled to the gearbox 122.

The exemplary gearbox 122 depicted generally includes a first gear coupled to the first plurality of turbine rotor blades 106, a second gear coupled to the second plurality of turbine rotor blades 108, and a third gear coupled to the turbine center frame 150. More specifically, for the embodiment depicted, the gearbox 122 is configured as a planetary gear box. Accordingly, the first gear is a ring gear 144, the second gear is a sun gear 148, and the third gear is a planet gear 146 (or rather a plurality of planet gears 146 coupled to a planet gear carrier, not shown). More specifically, the exemplary turbine section 100 depicted further a center frame support assembly 154 coupled to the turbine center frame 150. The center frame support assembly 154, for the embodiment depicted, includes a radially inner center frame support member 158 and a radially outer center frame support member 160. The plurality of planet gears 146 (or the planet gear carrier, not shown) are fixedly coupled (i.e., fixed along a circumferential direction) to the turbine center frame 150 through the center frame support assembly 154, and more particularly, through the radially inner center frame support member 158 of the center frame support assembly 154 (which couples to the gearbox 122 at an aft side of the gearbox 122 for the embodiment shown).

In such a manner, it will be appreciated that for the embodiment depicted the first plurality of turbine rotor blades 106 are configured to rotate in an opposite direction than the second plurality of turbine rotor blades 108. For example, the first plurality of turbine rotor blades 106 may be configured to rotate in a first circumferential direction C1 (see FIG. 4, below), while the second plurality of turbine rotor blades 108 may be configured to rotate in a second circumferential direction C2 (see FIG. 4, below), opposite the first circumferential direction C1.

It should further be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

It will further be appreciated that for the embodiment depicted, the first plurality of turbine rotor blades 106 is configured as a plurality of low-speed turbine rotor blades, while the second plurality of turbine rotor blades 108 is configured as a plurality of high-speed turbine rotor blades. Such may be due to the gearing of the gearbox 122 and the fact that the first plurality of turbine rotor blades 106 are directly rotatable with the spool 124 (which may limit a rotational speed of the first plurality of turbine rotor blades 106). Regardless, it will be appreciated that in such an exemplary embodiment, the first support member 128 of the first support member assembly 126 is a low-speed support member, and further, the second support member of the second support member assembly is a high-speed support member.

As is depicted and previously discussed, the first plurality of turbine rotor blades 106 is coupled to the first gear, i.e., the ring gear 144, of the gearbox 122 through the first support member 128, and the second plurality of turbine rotor blades 108 is coupled to the second gear, i.e., the sun gear 148, of the gearbox 122 through the second support member 134. As is also depicted, the first support member 128 extends aft of the gearbox 122, and more specifically, extends around an aft end of the gearbox 122. More specifically, still, for the embodiment depicted, the first support member 128 extends generally from the radially inner end 110 of the first turbine rotor blade 106A of the first plurality of turbine rotor blades 106 (i.e., a location aligned with, or forward of, the gearbox 122 along the axial direction A), around the aft end of the gearbox 122 and to the spool 124 to mechanically couple the first plurality of turbine rotor blades 106 to the spool 124.

Moreover, referring to FIG. 2, the turbomachine includes a first bearing assembly 162 to support the various rotating components of the turbine 104 described herein and further to support the spool 124 within the turbine section 100. More specifically, for the embodiment depicted, the spool 124 and first support member 128 are supported aft of the midpoint 176 of the turbine 104 substantially completely through the first bearing assembly 162. More specifically, still, for the embodiment depicted, the spool 124 and first support member 128 are supported within the turbine section 100 substantially completely through the first bearing assembly 162. As is depicted, and as will be appreciated, for the embodiment of FIG. 2 the first bearing assembly 162 is positioned between the first support member 128 and second support member 134 (or rather between the first support member 128 and an aft arm 136 of the second support member 134), at a location aft of the midpoint 176 of the turbine 104, and radially outward of the gearbox 122. More specifically, still, for the embodiment depicted, the first bearing assembly 162 is positioned between the first support member 128 and the second support member 134 at a location aft of an aft-most edge 174 of the aft-most turbine rotor blade of the first and second pluralities of turbine rotor blades 106, 108.

Referring still to FIG. 2, for the exemplary embodiment depicted, the first bearing assembly 162 generally includes a first bearing 164 and a second bearing 166. The first and second bearings 164, 166 are each configured as inter-shaft bearings positioned between the first support member 128 and the aft arm 136 of the second support member 134. More specifically, for the embodiment depicted, the first bearing 164 is configured as a roller bearing and the second bearing 166 is configured as a ball bearing. However, in other exemplary embodiments, the first bearing assembly 162 may include any other suitable number of bearings, such as a single bearing, three bearings, etc., with such bearings being configured in any suitable manner (e.g., any combination of roller bearing(s), ball bearing(s), tapered roller bearing(s), air bearing(s), etc.).

Furthermore, for the exemplary embodiment depicted, the turbomachine further comprises a second bearing assembly 167. The second bearing assembly 167 is further configured to rotatably support the second support member 134, and more specifically, is configured to support the forward arm 137 of the second support member 134. The second bearing assembly 167, for the embodiment depicted, includes a first bearing 168 and a second bearing 170, the first and second bearings 168, 170 of the second bearing assembly 167 supported by the turbine center frame 150 through the radially outer center frame support member 160.

It should be appreciated, however, that in other exemplary embodiments, the second bearing assembly 167 may be positioned elsewhere to support the second support member assembly 134. For example, in other embodiments, the bearings 168, 170 of the second bearing assembly 167 may instead be positioned between the forward arm 137 and the radially inner center frame support member 158.

Inclusion of a first bearing assembly and support system in a turbine with alternatingly spaced turbine rotor blades may allow for the turbine to be supported substantially completely through a turbine center frame of the turbine section. Such a configuration may therefore allow for substantially no support of the turbine to be directed through a turbine rear frame of the turbine section. Accordingly, such may allow for a much lighter turbine rear frame (and a lighter outer case supporting the turbine rear frame) and a more aerodynamic turbine rear section. It will therefore be appreciated that in certain exemplary embodiments, the turbine section may not include a turbine rear frame. Furthermore, positioning a gearbox connecting a first and a second plurality of alternatingly spaced turbine rotor blades in an aft location may allow for the turbomachine to isolate vibrations experienced during operation of the turbomachine. More specifically, positioning the gearbox in the aft location may allow for vibrations of the gearbox to be isolated from a center section of the turbomachine such that any of such vibrations will have a reduced effect on the turbomachine.

It should be appreciated that in other exemplary embodiments, the turbomachine, and more specifically, the turbine section 100 of the turbomachine may have any other suitable configuration. For example, referring now to FIG. 3, a turbine section 100 in accordance with another exemplary embodiment of the present disclosure is depicted schematically. The exemplary turbine section 100 depicted in FIG. 3 may be configured in substantially the same manner as exemplary turbine section 100 depicted in FIG. 2. For example, the exemplary turbine section 100 generally includes a first plurality of turbine rotor blades 106 rotatable with a second plurality of turbine rotor blades 108 through gearbox 122, with the gearbox aligned with, or position aft of, a midpoint 176 of the turbine 104. The gearbox 122 generally includes a first gear coupled to the first plurality of turbine rotor blades 106, a second gear coupled to the second plurality of turbine rotor blades 108, and a third gear coupled to a turbine center frame 150. Further, the turbine section 100 includes a support member with the first plurality of turbine rotor blades 106 coupled to a spool 124 through the support member, with the support member extending aft of the gearbox 122.

Figure 3:
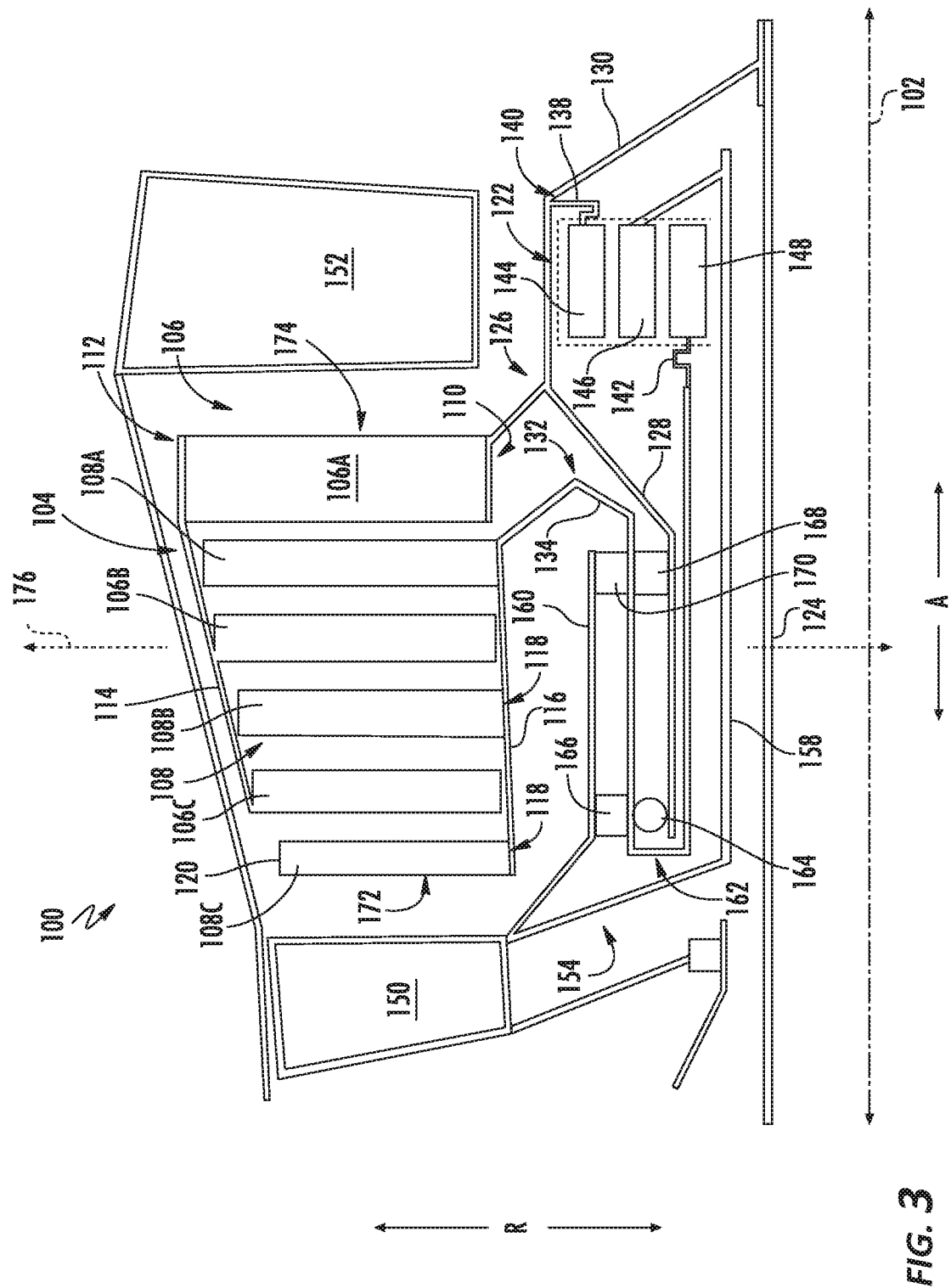
FIG. 3 is a close-up, schematic, cross sectional view of a turbine section in accordance with yet another exemplary aspect of the present disclosure.

More specifically, for the embodiment of FIG. 3, the support member is an aft support member 130 of a first support member assembly 126. The first support member assembly 126 further includes a forward support member 128. Notably, however, for the embodiment of FIG. 3, a bearing assembly 162 of the turbine section 100 is positioned forward of the gearbox 122. Further, the bearing assembly 162 includes a total of four bearings substantially completely supporting the turbine 104 within the turbine section 100. The exemplary turbine section 100 therefore does not include a separate, second bearing assembly, such as bearing assembly 167 (see FIG. 2- or alternatively may include the bearing assembly 167 and not the bearing assembly 162).

It will further be appreciated that in at least certain exemplary embodiments, the first plurality of turbine rotor blades 106 and the second plurality of turbine rotor blades 108 may have any other suitable configuration. For example, in other exemplary embodiments, the first and/or second pluralities of turbine rotor blades 106, 108 may be configured in a split drum configuration. More specifically, in certain alternative exemplary embodiments, the first plurality of turbine rotor blades 106 may include a first turbine rotor blade 106A, a second turbine rotor blade 106B, and a third turbine rotor blade 106C spaced along an axial direction A. A radially outer end 112 of the first turbine rotor blade 106A may be coupled to a radially outer end 112 of the second turbine rotor blade 106B, and a radially inner end 110 of the second turbine rotor blade 106B may be coupled to a radially inner end 110 of the third turbine rotor blade 106C. For example, the first turbine rotor blade 106A and second turbine rotor blade 106B of the first plurality of turbine rotor blades 106 may be coupled through a first outer drum, and further the second turbine rotor blade 106B and the third turbine rotor blade 106C of the first plurality of turbine rotor blades 106 may be coupled through a first inner drum.

Further, in certain of these alternative exemplary embodiments, the second plurality of turbine rotor blades 108 may similarly include a first turbine rotor blade 108A, a second turbine rotor blade 108B, and a third turbine rotor blade 108C spaced along an axial direction A, and more particularly, alternatingly spaced along the axial direction A with the first plurality of turbine rotor blades 106. A radially inner end 118 of the first turbine rotor blade 108A may be coupled to a radially inner end 118 of the second turbine rotor blade 108B, and further, a radially outer end 120 of the second turbine rotor blade 108B may be coupled to the radially outer end 120 of the third turbine rotor blade 108C. More specifically, the first turbine rotor blade 108A and second turbine rotor blade 108B may be coupled through a second inner drum 117, and the second turbine rotor blade 108B and the third turbine rotor blade 108C may be coupled through a second outer drum 115. Other configurations are contemplated as well.

Figure 4:
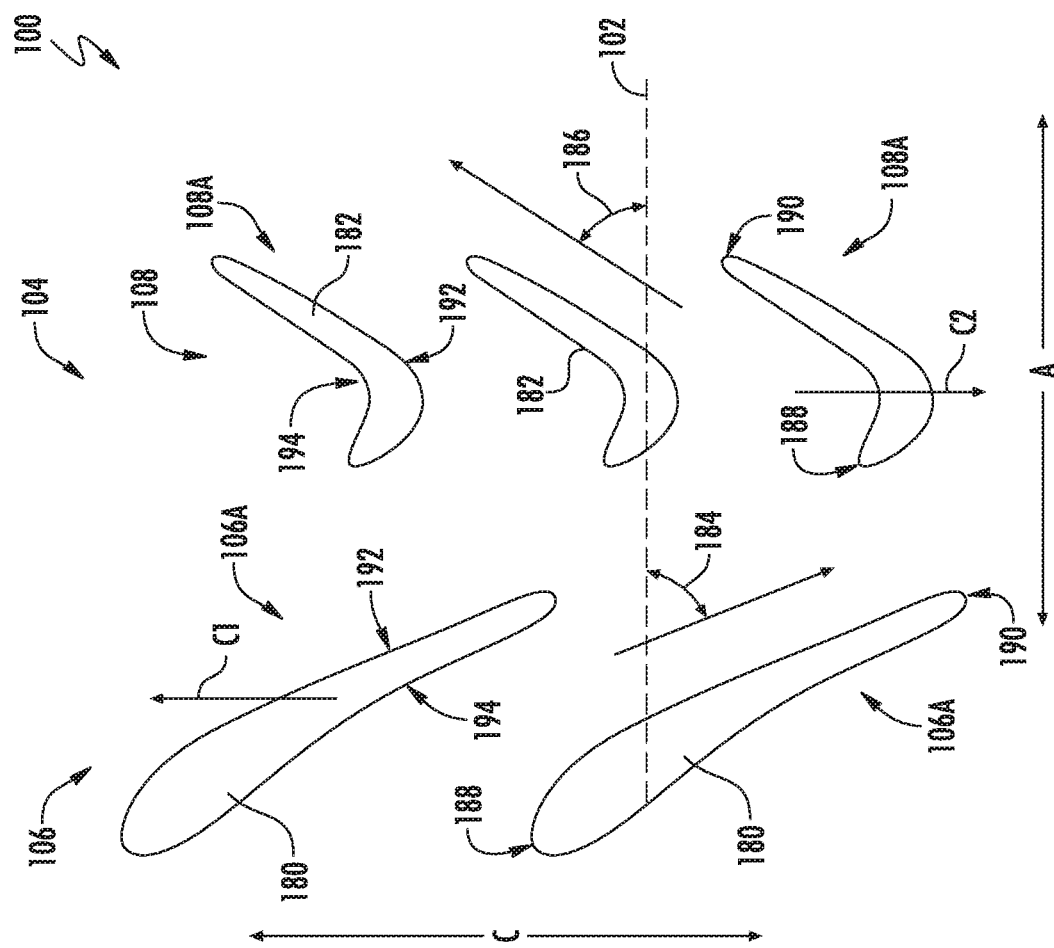
FIG. 4 is cross sectional view depicting exemplary blade pitch angles of a turbine of a turbine section in accordance with an exemplary embodiment of the present disclosure.

Referring now to FIG. 4, an exemplary embodiment of an orientation of the first plurality of turbine rotor blades 106 and the second plurality of turbine rotor blades 108 is generally provided. The first plurality of turbine rotor blades 106 and the second plurality of turbine rotor blades 108 may be the same rotor blades discussed above with reference to, e.g., FIGS. 2 and 3.

More specifically, the embodiment of FIG. 4 depicts a first stage of turbine rotor blades 106A of the first plurality of turbine rotor blades 106 and a first stage of turbine rotor blades 108A of the second plurality of turbine rotor blades 108. In at least certain exemplary embodiments, the first plurality of turbine rotor blades may be configured to rotate in a first circumferential direction C1, while the second plurality of turbine rotor blades may be configured to rotate in a second circumferential direction C2.

It will be appreciated that for the embodiment depicted, each of the turbine rotor blades 106A of the first plurality of turbine rotor blades 106 include an airfoil 180, and similarly, each of the turbine rotor blades 108A of the second plurality of turbine rotor blades 108 include an airfoil 182. The airfoils 180 each define an exit angle 184, and similarly the airfoils 182 each define an exit angle 186. The exit angles 184, 186 each represent an angular relationship of a longitudinal centerline 102 (i.e., of the turbomachine within which they are installed) to an exit direction of the gases flowing from an upstream end 188 towards a downstream end 190 of the respective airfoils 180, 182. For the embodiment depicted, the exit angle 184 may be a negative angle, such as a negative acute angle, while the exit angle 186 may be a positive angle, such as a positive acute angle ("positive" and "negative" being used herein to denote a relative value of the respective exit angles 184, 186 viewed from the same perspective). Notably, the exit angles 184, 186 of the airfoils 180, 182, respectively, a cause the first plurality of turbine rotor blades 106 and second plurality of turbine rotor blades 108 to rotate in the first and second circumferential directions C1 C2, respectively.

Referring still to FIG. 4, the airfoils 180, 182 may each further include a suction side 192 and a pressure side 194. The suction side 192 of the airfoils 180 are configured as convex toward the first circumferential direction C1 and the pressure side 194 of the airfoils 180 are configured as concave toward the first circumferential direction C1. The suction side 192 of the airfoils 182 are configured as convex toward the second circumferential direction C2 and the pressure side 194 of the airfoils 180 are configured as concave toward the second circumferential direction C2. Such a configuration may further result in the first plurality of turbine rotor blades 106 and second plurality of turbine rotor blades 108 rotating in the first and second circumferential directions C1, C2, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining a radial direction and an axial direction, the turbomachine comprising:
   a spool;
   a turbine section comprising a turbine center frame and a turbine, the turbine comprising a first plurality of turbine rotor blades and a second plurality of turbine rotor blades, each plurality positioned aft of the turbine center frame and forward of a turbine rear frame, the first plurality of turbine rotor blades and second plurality of turbine rotor blades alternatingly spaced along the axial direction, the turbine defining a midpoint along the axial direction;
   a gearbox aligned with, or positioned aft of, the midpoint of the turbine, the gearbox comprising a first gear coupled to the first plurality of rotor blades, a second gear coupled to the second plurality of rotor blades, and a third gear coupled to and supported by the turbine center frame; and
   a support member, the first plurality of turbine rotor blades coupled to the spool through the support member, the support member extending aft of the gearbox.

2. The turbomachine of claim 1, wherein the support member is a first support member, wherein the turbomachine further comprises:
   a bearing assembly; and
   a second support member, the second plurality of turbine rotor blades supported by the second support member, wherein the spool and first support member are supported aft of the midpoint of the turbine through the bearing assembly, the bearing assembly positioned between the first support member and second support member.

3. The turbomachine of claim 1, wherein the support member is a first support member, wherein the turbomachine further comprises:
   a bearing assembly; and
   a second support member, the second plurality of turbine rotor blades supported by the second support member, wherein the spool and first support member are supported within the turbine section through the bearing assembly, the bearing assembly positioned between the first support member and second support member.

4. The turbomachine of claim 3, wherein the bearing assembly is positioned aft of the midpoint of the turbine.

5. The turbomachine of claim 3, wherein the bearing assembly is a first bearing assembly, wherein the first bearing assembly comprises a first bearing and a second bearing, and wherein the turbomachine further comprises:
   a second bearing assembly supporting the second support member.

6. The turbomachine of claim 5, wherein the first bearing is configured as a roller bearing and the second bearing is configured as a ball bearing.

7. The turbomachine of claim 3, wherein the bearing assembly is aligned with and positioned radially outward of the gearbox.

8. The turbomachine of claim 1, wherein the first plurality of turbine rotor blades is configured as a plurality of low-speed turbine rotor blades, and wherein the second plurality of turbine rotor blades is configured as a plurality of high-speed turbine rotor blades.

9. The turbomachine of claim 8, wherein the plurality of low-speed turbine rotor blades each extend between an inner end along the radial direction and an outer end along the radial direction, and wherein at least two of the plurality of low-speed turbine rotor blades are spaced from one another along the axial direction and coupled to one another at the outer ends.

10. The turbomachine of claim 8, wherein the plurality of high-speed turbine rotor blades each extend between an inner end along the radial direction and an outer end along the radial direction, and wherein at least two of the plurality of high-speed turbine rotor blades are spaced from one another along the axial direction and coupled to one another at the inner ends.

11. The turbomachine of claim 8, wherein the plurality of low-speed turbine rotor blades are configured to rotate in a first circumferential direction, and wherein the plurality of high-speed turbine rotor blades are configured to rotate in a second circumferential direction opposite the first circumferential direction.

12. A turbomachine defining a radial direction and an axial direction, the turbomachine comprising:
   a spool;
   a turbine section comprising a turbine center frame and a turbine, the turbine comprising a first plurality of turbine rotor blades and a second plurality of turbine rotor blades, each plurality positioned aft of the turbine center frame and forward of a turbine rear frame, the first plurality of turbine rotor blades and second plurality of turbine rotor blades alternatingly spaced along the axial direction;
   a gearbox comprising a first gear coupled to the first plurality of rotor blades, a third gear coupled to and supported by the turbine center frame, and a second gear coupled to the second plurality of rotor blades;
   a first support member, the first plurality of turbine rotor blades coupled to the spool through the first support member;
   a second support member coupled to the second plurality of turbine rotor blades; and
   a bearing assembly positioned between the first and second support members, the spool and the first plurality of turbine rotor blades supported within the turbine section through the bearing assembly.

13. The turbomachine of claim 12, wherein the first support member extends around an aft end of the gearbox.

14. The turbomachine of claim 12, wherein the bearing assembly is positioned aft of the midpoint of the turbine.

15. The turbomachine of claim 12, wherein the bearing assembly comprises a first bearing and a second bearing.

16. The turbomachine of claim 15, wherein the first bearing is configured as a roller bearing and the second bearing is configured as a ball bearing.

17. The turbomachine of claim 12, wherein the bearing assembly is aligned with and positioned radially outward of the gearbox.

18. The turbomachine of claim 12, wherein the first plurality of turbine rotor blades is configured as a plurality of low-speed turbine rotor blades, and wherein the second plurality of turbine rotor blades is configured as a plurality of high-speed turbine rotor blades.

19. The turbomachine of claim 18, wherein the plurality of low-speed turbine rotor blades each extend between an inner end along the radial direction and an outer end along the radial direction, and wherein at least two of the plurality of low-speed turbine rotor blades are spaced from one another along the axial direction and coupled to one another at the outer ends, and wherein the plurality of high-speed turbine rotor blades each extend between an inner end along the radial direction and an outer end along the radial direction, and wherein at least two of the plurality of high-speed turbine rotor blades are spaced from one another along the axial direction and coupled to one another at the inner ends.

20. The turbomachine of claim 18, wherein the plurality of low-speed turbine rotor blades is coupled to the first gear of the gearbox through a first flexible member, and wherein the plurality of high-speed turbine rotor blades is coupled to the second gear of the gearbox through a second flexible member.

21. The turbomachine of claim 1, wherein the turbine center frame is positioned forward of the turbine.

* * * * *